United States Patent [19]

Devins et al.

[11] Patent Number: 5,784,595
[45] Date of Patent: Jul. 21, 1998

[54] DMA EMULATION FOR NON-DMA CAPABLE INTERFACE CARDS

[75] Inventors: Robert J. Devins, Essex Junction, Vt.; Stephen Hon, Scarborough; Patrick Kam, Pickering, both of Canada; Emory D. Keller, Jericho, Vt.

[73] Assignee: International Business Machines Corporation, Armonk, N.Y.

[21] Appl. No.: 908,214

[22] Filed: Aug. 7, 1997

Related U.S. Application Data

[63] Continuation of Ser. No. 475,665, Jun. 7, 1995, abandoned.

[30] Foreign Application Priority Data

Nov. 9, 1994 [CA] Canada ................. 2135505

[51] Int. Cl.$^6$ ................. G06F 31/00; G06F 13/32
[52] U.S. Cl. ................. 395/500; 395/821; 395/842; 395/843; 395/846; 364/578
[58] Field of Search ................. 395/500, 821, 395/842, 843, 846; 364/242.3, 242.31, 242.34, DIG. 1, 578

[56] References Cited

U.S. PATENT DOCUMENTS

| | | | |
|---|---|---|---|
| 4,313,160 | 1/1982 | Kaufman et al. | 364/200 |
| 4,658,350 | 4/1987 | Eggebrecht et al. | 364/200 |
| 4,665,481 | 5/1987 | Stonier et al. | 364/200 |
| 4,665,482 | 5/1987 | Murray, Jr. et al. | 364/200 |
| 4,751,634 | 6/1988 | Burrus, Jr. et al. | 364/200 |
| 4,847,750 | 7/1989 | Daniel | 364/200 |
| 5,088,033 | 2/1992 | Binkley et al. | 395/500 |
| 5,274,779 | 12/1993 | Stewart et al. | 395/425 |
| 5,381,538 | 1/1995 | Amini et al. | 395/483 |

*Primary Examiner*—Kevin J. Teska
*Assistant Examiner*—Thai Phan
*Attorney, Agent, or Firm*—Anthony N. Magistrale

[57] ABSTRACT

A method and system are disclosed for simulating a direct memory access (DMA) function to access memory in a host computer having a DMA controller for the purpose of enabling the transfer of data between the host memory and a computer accessory data handling device not capable of DMA operation. The accessory data handling device can be operably connected to the host. The address contents of the DMA controller can be read to determine the location in the host memory where data is to be transferred from the host memory to the accessory data handling device or from the accessory data handling device to the host memory. Data is read from the host memory at the address specified in the DMA controller and written to the accessory data handling device or read from the accessory data handling device and written to the host memory at the address specified by the DMA controller, respectively. The host computer is informed that a DMA operation corresponding to the data transfer has been completed when the data transfer required has been completed.

28 Claims, 4 Drawing Sheets

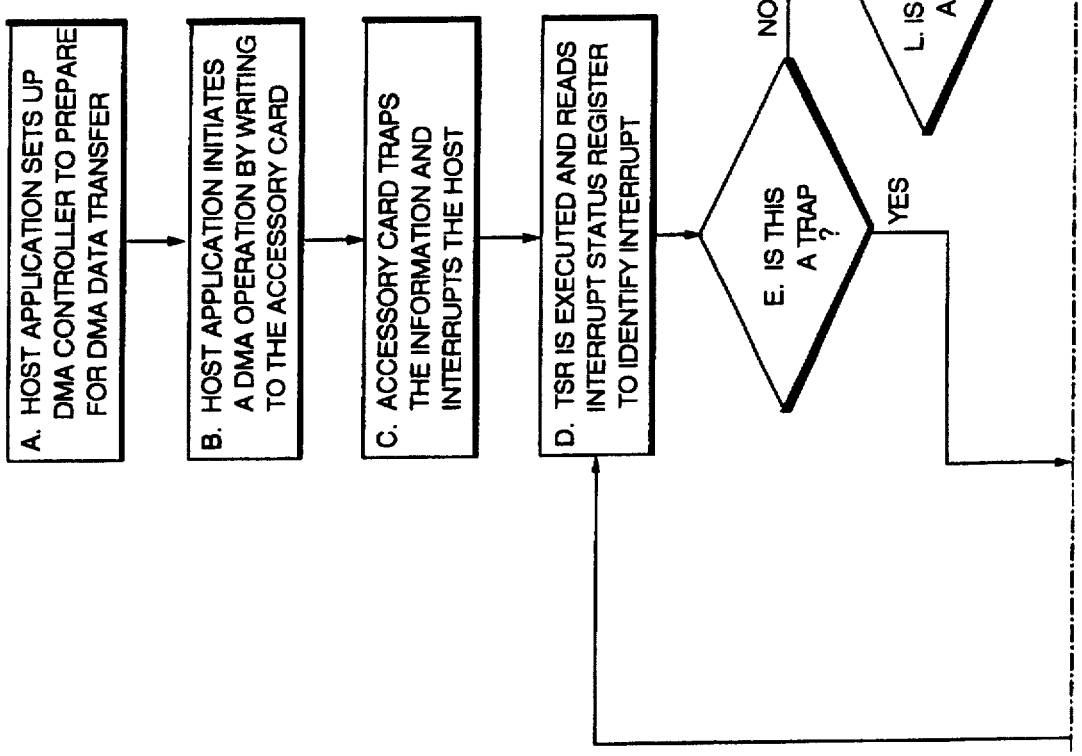

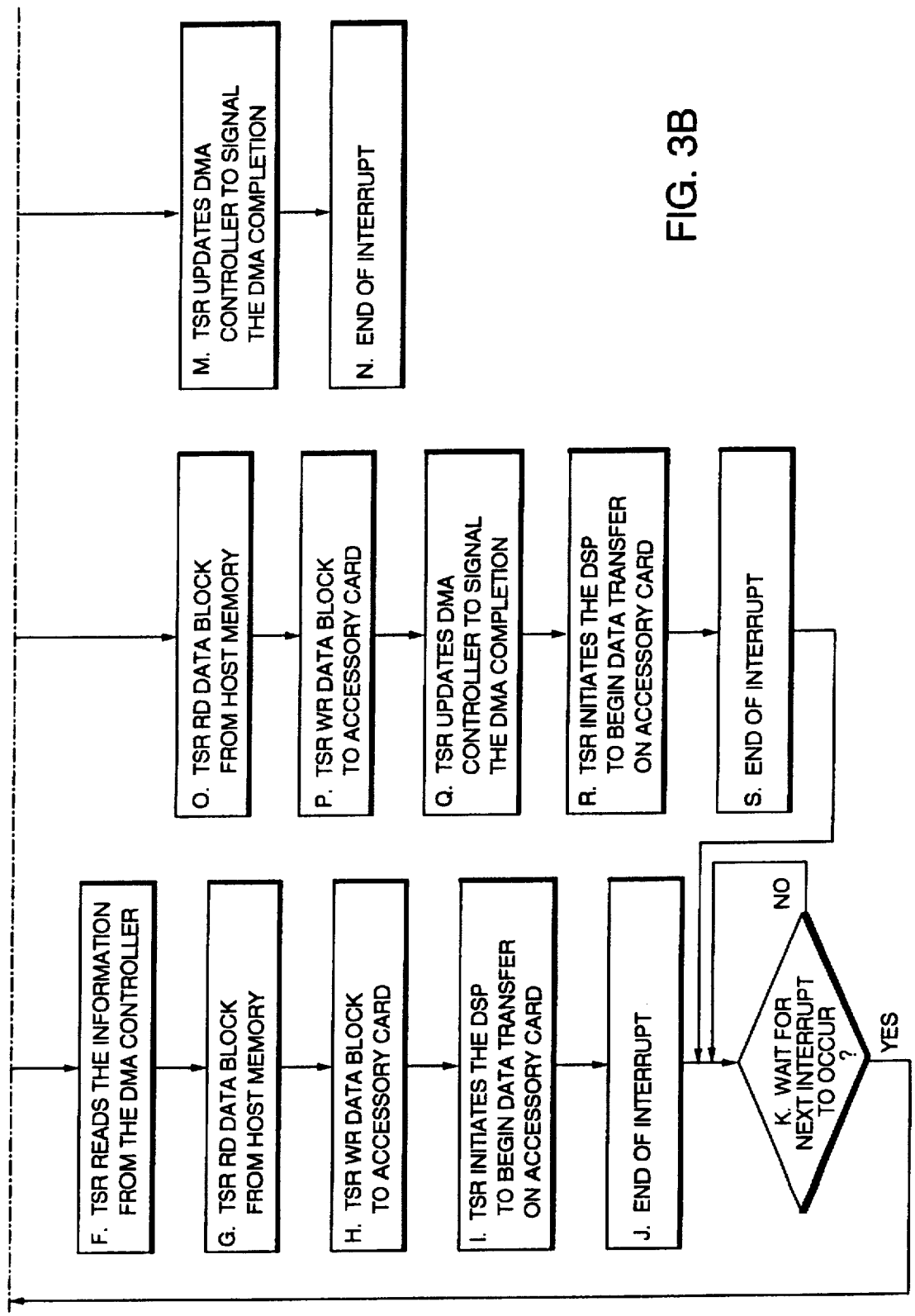

DMA EMULATION FOR NON-DMA CAPABLE INTERFACE CARDS

This application is a continuation of application Ser. No. 08/475,665, filed Jun. 7, 1995, abandoned now.

FIELD OF THE INVENTION

The present invention relates to the field of computer systems using direct memory access (DMA) controllers for direct memory access and more particularly to interface or accessory cards (otherwise referred to as accessory data handling devices) not capable of direct memory access that emulate direct memory access operations for compatibility with programming running on the computer systems that use direct memory access.

BACKGROUND OF THE INVENTION

When the IBM Personal Computer, now known as the IBM PC, was introduced it included a central processing unit (CPU) a random access memory (RAM) and a DMA controller which served the function of allowing direct memory access to the RAM memory without the necessity of using the CPU to control the memory access, thus freeing up the CPU for other processing activities. This improved efficiency over previous computers. The direct memory access capability of the IBM PC was carried over to the IBM Personal Computer AT and the IBM PS/2 Micro Channel designs and in fact has been carried over to many PC's in the industry including industry standard architecture (ISA) computers. ISA is based on AT computer architecture.

U.S. Pat. No. 4,658,350 issued Apr. 14, 1987, owned in common with the present invention, may be referred to for a teaching of DMA architecture. U.S. Pat. No. 4,658,350 is hereby incorporated by reference into the present application.

As a result of the common use of DMA architecture, software that runs on PC computers is frequently designed to take advantage of the direct memory access capabilities, by initiating DMA operations for transfers of data between the host RAM memory and peripherals operating with the host system. This applies to both read operations in which data is read from the host RAM memory and write operations in which data is written to the host RAM memory.

Referring to FIG. 1 which depicts a host PC computer, the typical software application that uses DMA first sets up the DMA controller 3 of the host PC 4 by writing to the DMA controller 3 the starting address of the location where data is to be written or read from in the host RAM memory 2, the amount of data to be transferred, and the type of operation to be performed (i.e., read or write). The following steps are used to perform a DMA transfer of data from the host RAM memory 2 to an accessory card (such as the sound card 10 depicted in FIG. 2, for instance), connected to the host by the ISA bus 5 and X bus 6. The application initiates a DMA operation to transfer data from the host to the card by first sending a command to the card to start DMA operation. The card then activates the DMA request line which is present in the host as part of the X bus 6. Next, the DMA controller returns an acknowledge signal on the host DMA acknowledge line (which is also part of the X bus 6). The data is then transferred from the RAM memory 2 of the host 4 to the card 10, under control of the DMA controller 3, which issues a read command on the read/write line (which is part of the X bus 6) of the host causing data to be transferred from the RAM memory 2 along the data bus (which is contained in the X bus 6 and ISA bus 5) of the host 4 to the adapter card.

The following steps are used for a DMA transfer of data from the accessory card to the host, in which the data is made available on the adapter card, either from data processing that has been carried on by the card, or from data that has been provided externally to the card. First, the card activates the DMA request line to request the services of the DMA controller in transferring the data. Next, the DMA controller sends a DMA acknowledge signal back to the card. The card then transfers the data onto the host data bus under control of the DMA controller which writes the data to the RAM memory of the host at the address specified by the DMA controller.

This works well if the card is DMA compatible, but if the accessory card is not adapted to connect to the DMA controller or is not DMA compatible, the accessory card will not be compatible with applications that use DMA.

There is a need for a system which will permit a non-DMA accessory card to function compatibly with applications which require DMA operation for successful operation while running on the host.

A number of different standards have been accepted for PC accessory boards. One of these standards, the Personal Computer Memory Card International Association (PCMCIA) standard, does not permit DMA transfers as no electrical connections are provided for these accessory cards to the host DMA request or acknowledge lines. PCMCIA cards are proving to be more popular in the computer industry because of their size advantage and use in laptops or notebook computers. Accordingly it would be useful in the case of the PCMCIA cards to provide a method and means to make them operable or compatible with the DMA operations of a host computer.

SUMMARY OF THE INVENTION

This invention provides a method and means for enabling an accessory card which is not capable in itself of DMA operation to operate in a host system having DMA compatibility with application software running that makes use of or requires DMA operation compatibility.

One embodiment of the invention provides a method of simulating a direct memory access (DMA) function to access memory in a host computer having a DMA controller controlling access to the memory for the purpose of enabling the transfer of data between the memory and a computer accessory card that can be operably connected to the host. The method includes determining the location in the host memory for data to be transferred from the host memory to the accessory card or from the accessory card to the host memory by reading the memory address contents of the DMA controller; reading data from the host memory at the address specified in the DMA controller and writing it to the accessory card or reading data from the accessory card and writing it to the host memory at the address specified by the DMA controller, respectively; and then informing the host computer that a DMA operation corresponding to the data transfer has been completed.

This embodiment of the invention preferably accomplishes reading the memory address contents of the DMA controller to determine the starting address of the location in the host memory for the data, and the maximum amount of data to be transferred.

Advantageously, the method of the invention may include updating the address information in the DMA controller as data is transferred between the host and the accessory card to maintain the currency of the DMA controller information corresponding to information that would be present if an actual DMA access of the memory had taken place.

The method of the invention may advantageously include, updating the information in the DMA controller to indicate the end of a DMA operation when the data transfer has been completed.

The method of the invention may also include, in the determination of the starting address, the calculation of an address compensation factor for determining the correct starting address if the DMA controller of the host free runs when it is unmasked.

Another embodiment of the invention includes means for simulating direct memory access with an accessory card, for use in a host computer having a memory and a DMA controller for direct memory access of the memory, in which the accessory card is not capable of taking advantage of direct memory access operations for the memory. This embodiment also includes means for responding to a host application command requesting a commencement of DMA operation, to read from the DMA controller the starting address, and preferably the maximum amount of data to be transferred. Means are also provided for reading data from the host memory or card respectively, and for writing data to the card or host memory respectively to transfer the data. This embodiment can also include means for updating addressing information in the DMA controller during the data transfer so that it corresponds with the information that would be present in the DMA controller if a true DMA operation were taking place, and means for informing the host application that the DMA operation has been completed after all of the required data has been transferred.

Means for updating the DMA controller to signal the end of a DMA operation after all of the required data has been transferred may be advantageously incorporated into this embodiment.

Furthermore the means for the determination of the starting address may advantageously include means for calculating an address compensation factor for determining the correct starting address if the DMA controller of the host free runs when it is unmasked.

The method of the present invention may be accomplished with a computer program recorded on suitable media for operating on a host computer with DMA architecture for enabling a computer accessory card to simulate a direct memory access (DMA) function to access memory in the host computer. The computer program includes a routine for determining the location in the host memory for data to be transferred from the host memory to the accessory card or from the accessory card to the host memory. This is accomplished with a routine for reading data from the host memory at the address specified in the host's DMA controller and for writing it to the accessory card or reading data from the accessory card and writing it to the host memory at the address specified by the DMA controller, respectively. The program further includes a routine for informing the host computer that a DMA operation corresponding to the data transfer has been completed.

The routine for reading the memory address contents of the DMA controller may include a routine for reading the starting address of the location in host memory for the data, and preferably the maximum amount of data to be transferred.

A routine may also be provided for updating the address information in the DMA controller as data is transferred between the host and accessory card to maintain the currency of the DMA controller information corresponding to information that would be present if an actual DMA access of the memory had taken place.

Moreover, the program may include a routine for updating information in the DMA controller to indicate the end of a DMA operation when the data transfer has been completed.

The routine for the determination of the starting address may include a routine for calculating an address compensation factor for determining the correct starting address if the DMA controller of the host free runs when it is unmasked.

Another embodiment of the present invention is directed to an accessory system for use in a host computer including an accessory card for connection to the host and a computer program recorded on suitable media for operation on the host; in which the accessory card need not be adapted to take advantage of DMA transfer of data between the host memory and the accessory card. The computer program is adapted to simulate the operation of the DMA controller to the host computer and transfer data required between the host memory and the accessory card.

Preferably, the accessory card includes a data cache or other memory means for storing data with which the data transfer with the host can be facilitated.

A computer system incorporating the accessory card and data program is also within the contemplation of the apparatus of the invention.

Another object of the invention is to provide a computer program, preferably as a terminate and stay resident program (TSR), which is operable on the host to emulate DMA operations when called upon by an application running on the host or on the accessory card or when called upon by the accessory card to access the RAM memory on the host controlled by the host's DMA controller.

A further object of the invention, in the case of the transfer of data from the host RAM memory to the accessory card, is to allow the application running on the host to set up the host's DMA controller by providing it with the starting address, data quantity and provides to the accessory card the exact amount of data to be transferred and the type of operation (read or write). For transfer from the host to the accessory card the application program sends a command to the card to start the DMA read operation.

In one optional implementation the accessory card activates an interrupt to the host (i.e., to its CPU) to stop it from performing other processing tasks. The TSR program is activated, which then identifies that a DMA operation has been requested. The TSR reads the contents of the DMA controller to obtain the starting address, and the maximum amount of data to be transferred. The TSR also reads the exact amount of data to be transferred and whether it is to be a read or write operation. It then reads data, preferably in blocks, from the host RAM memory and writes the data to the appropriate memory of the accessory card. After TSR has completed its operation the TSR can end the interrupt, if an interrupt has been requested, of the host CPU.

In the case of the transfer of data in the other direction, i.e., from the card to the host, for instance, where data has been generated by the card, or received by the card, for instance by external input for transfer to the host, the card notifies the host that a data transfer is required. It can do this by generating an interrupt to the CPU; after which the TSR is activated and identifies that a data transfer is required from the card to the memory. The TSR reads the contents of the DMA controller to obtain the start address and maximum byte count of data to be transferred. (Note that the DMA controller was set up previously by the application program with the start address of the data, and the maximum byte count of data to be transferred.) The TSR reads from the card the exact amount of data to be transferred and whether it is a read or write operation. The TSR reads data from the card and writes the data to the RAM memory of the host. After writing has been completed the interrupt request is ended. This process is repeated until all data has been transferred.

BRIEF DESCRIPTION OF THE DRAWINGS

FIG. 3 is a flow chart of an embodiment of the method of the present invention.

DETAILED DESCRIPTION OF THE INVENTION

Figure 1:
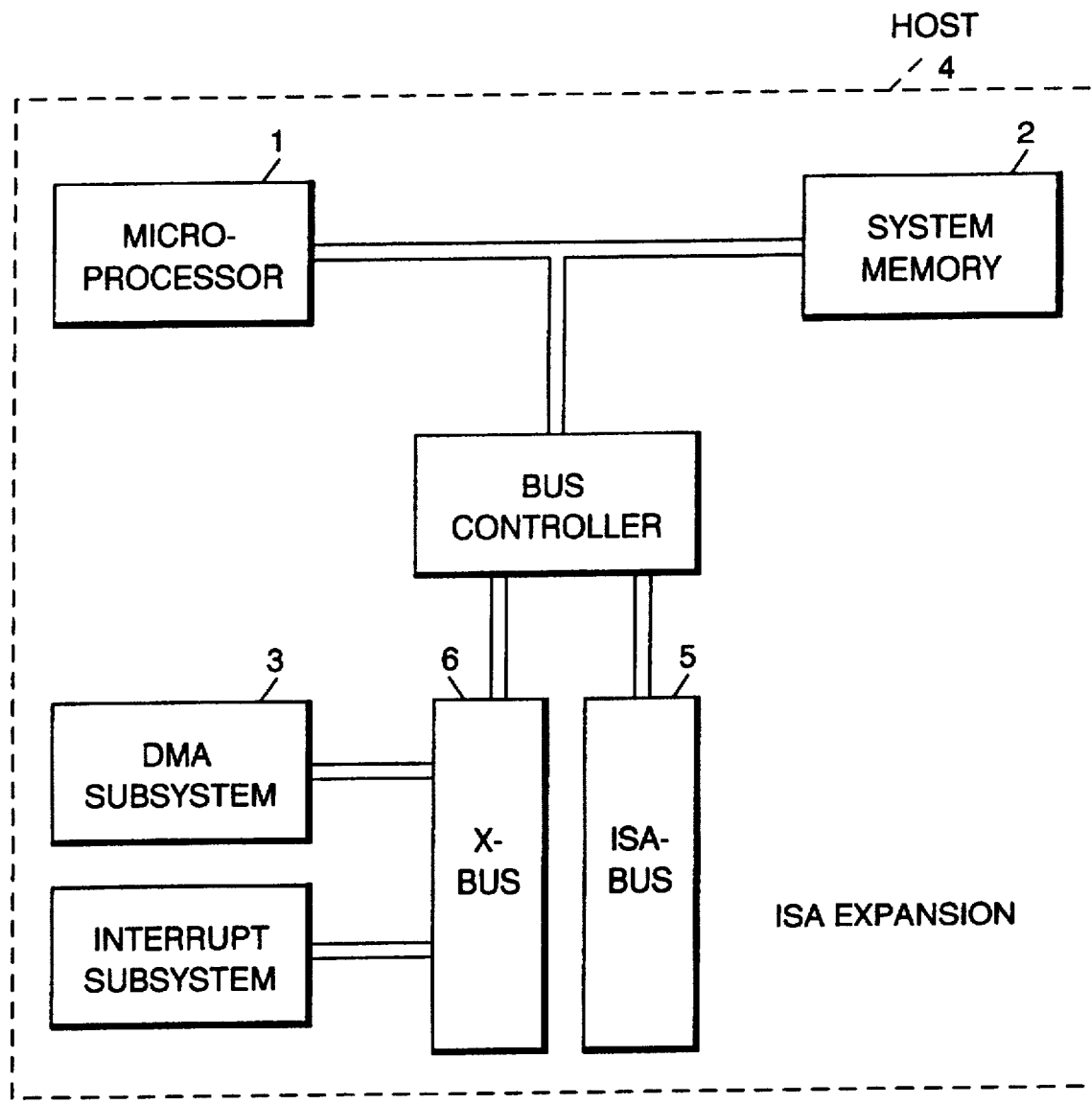
FIG. 1 is a block diagram of a host computer illustrating the major components thereof.

The following is a step-by-step description of an embodiment of the invention (using a TSR in accordance with the invention) for transfer of data between the host 4 and accessory card 10:

(1) The (software) application running in the host 4 sets up the DMA controller 3 using the current address register of the DMA controller 3 and the page address register of the host 4 (the DMA and page registers are well known and need not be described further) with the starting address in memory 2 of where the data is to be read from; and the maximum amount of data to be transferred using the DMA count register;

(2) The host (software) application sends a command to the accessory card to start DMA operation and informing it of the amount of data to be transferred and that the operation to be performed is a write operation to the card; (the information is stored in a buffer or memory on the card);

(3) The card responds by sending an interrupt to the host activating the TSR;

(4) The TSR reads from the DMA controller the start address and reads from the card (from a buffer or memory on the card) the byte count (amount of data to be transferred) and the control information required (a write instruction). The TSR keeps track of the information read from the DMA controller for subsequent operations;

(5) The accessory card interrupts the host for the subsequent transfer of data required;

(6) The TSR reads data from the host;

(7) The TSR writes data to the accessory card;

(8) End of interrupts (EOI) is signalled by the TSR to the host;

(9) Steps 5 to 8 are repeated until the number of bytes transferred is equal to the number of bytes read from the DMA controller originally thus confirming that the total amount of data desired has been transferred. The DMA controller addressing information is updated as the data is transferred to keep the DMA controller information current;

(10) The TSR updates the DMA controller (e.g., inserting −1) to signal the end of the DMA operation, or informs the host application that the DMA operation has been completed.

A transfer of information from the accessory card 10 to the host 4 can be accomplished in a similar manner, but opposite in direction as follows:

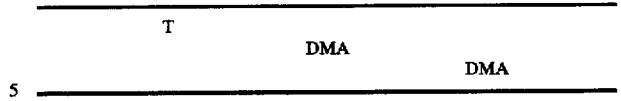

in memory of where the data is to be written to host memory 2; the maximum amount of data to be transferred using the DMA count register;

(2) The host (software) application sends a command to the accessory card to start DMA operation and informing it of the amount of data to be transferred and that the operation to be performed is a write operation;

(3) The card 10 responds by sending an interrupt to the host 4 activating the TSR;

(4) The TSR reads from the DMA controller 3 the start address, the maximum byte count of data to be transferred and reads from the accessory card 10 the exact amount of data to be transferred and the control information required (in this case, that it is a read instruction). The TSR keeps track of the information read from the DMA controller for subsequent operations;

(5) The accessory card 10 interrupts the host 4 for the subsequent transfer of data required;

(6) The TSR reads data from the card 10 (for instance from a card buffer or a data port);

(7) The TSR writes data to host memory 2;

(8) End of interrupts (EOI) is signalled by the TSR to the host 4;

(9) Steps 5 to 8 are repeated until the number of bytes transferred is equal to the number of bytes read from the DMA controller 3 originally thus confirming that the total amount of data desired has been transferred. The DMA controller 3 addressing information is updated as the data is transferred to keep the DMA controller 3 information current;

(10) The TSR updates the DMA controller 3 (e.g., inserting −1) to signal the end of the DMA operation, or informs the host application that the DMA operation has been completed.

In one implementation of the invention which is preferable, the accessory card 10 contains a data buffer for accumulating data to be transferred to compensate for differences in processing availability or speed of host 4 and the accessory card 10.

Figure 2:
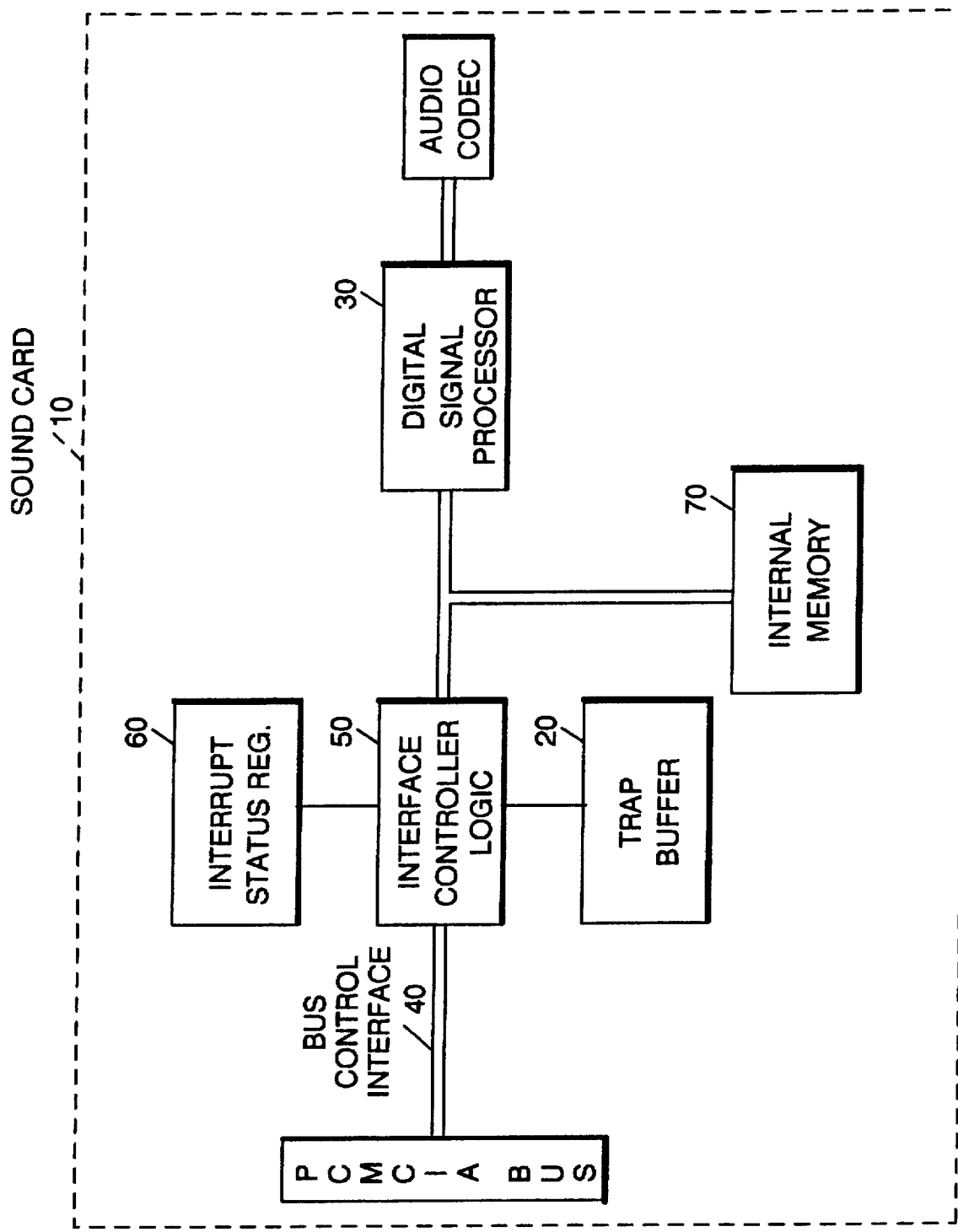
FIG. 2 is a block diagram of a PCMCIA sound card made in accordance with the invention herein.

For a further understanding of the invention herein reference should be made to the flow diagram of FIG. 3 which illustrates a particular mode of the invention as applied to a PCMCIA accessory card, such as that depicted in FIG. 2, which incorporates a buffer or trap 20.

The following is a description of the application of a specific embodiment of the invention to a PCMCIA audio card that is depicted in FIG. 2, which is adapted to respond to the same instructions used for Soundblaster ISA compatible audio cards. Many audio cards on the market emulate the functions of a Soundblaster card and respond to the same instructions. ISA compatible cards are generally capable of use with DMA and software applications using DMA, whereas PCMCIA cards are not; restricting, up until now, the applications they can be used with.

The pseudocode depicted and discussed below is a specific embodiment of the invention herein adapted for use with PCMCIA audio cards in accordance with FIG. 2 to emulate DMA functions so that a host application calling for Soundblaster (SB hereinafter) audio functions using DMA will operate successfully.

In this particular embodiment of the invention, when the host application requires a DMA transfer, it sets up the DMA controller to prepare for DMA data transfer (Step A). The host application initiates a DMA operation by writing to the accessory card 10 (Step B). Upon the host access that indicates a DMA initiation by the host 4, the accessory card 10 traps the information in trap 20 (under control of interface controller 50) and interrupts the host (Step C).

On an interrupt to the host, the TSR will be executed and reads the interrupt status register 60 on the accessory card 10 to identify the source of interrupt (Step D). If the source is determined to be a trap of a DMA initiation (Step E), the TSR reads the information from the DMA controller 3 (Step F) and trap 20. The information read from the DMA controller 3 includes the starting memory location of the DMA transfer and the maximum requested size of the block of data in memory to be transferred, as discussed previously. The information from the trap 20 includes the exact size of the data to be transferred and whether it is to be a read or write operation.

On a data transfer from the host 4 to the card 10, the TSR reads the block of data from the host memory 2 (Step G) and writes the block of data to internal memory 70 on the accessory card 10 (Step H). The TSR then initiates the internal logic (interface controller 50) on the accessory card 10 to begin data transfer on the accessory card 10 (Step I). The TSR then issues an end of interrupt (Step J) and exits the routine. In this particular example, the accessory card 10 will interrupt the host upon completion of the internal data transfer (Step K). Upon this next interrupt, the TSR will be executed at Step D.

If the TSR determines in Step E that the interrupt does not represent a trap, it will query whether the system is in a auto DMA mode. If the system is not in the auto DMA mode (Step L), the TSR updates the DMA controller 3 to signal the completion of the DMA operation (Step M) and issues an end of interrupt to end its execution (Step N). The auto DMA mode is characterized by the immediate restarting of the DMA sequence once it is completed. It is used in sound cards to keep a continuous flow of sound.

If the TSR determines in Step L that the system is in auto DMA mode; for a transfer of data from the host 4 to the accessory card 10, the TSR reads a data block from the host memory 2 (Step O) and writes the data block to the internal memory 70 of the accessory card 10 (Step P). It then updates the DMA controller 3 to signal the completion of a DMA cycle (Step Q) and initiates the internal logic (interface controller 50) on the card 10 to begin data transfer on the accessory card 10 (Step R). It then issues an end of interrupt and exits the routine (Step S). In this particular example, the accessory card 10 will interrupt the host upon completion of the internal data transfer (Step K). Upon this next interrupt, the TSR will be executed at Step D.

The TSR program embodiment of the invention described below is used to (1) move data from a host memory 2 to the PCMCIA audio card 10 and (2) to simulate to the host application program (or game) that a true hardware DMA operation actually occurred as requested by the application. The object of DMA emulation, is to allow SB applications to run as if there really were hardware DMA available to them. In this embodiment, DMA emulation is triggered by specific SB commands that are trapped in trap 20 of card 10. DMA emulation in accordance with the invention finds the physical host address of data and length of a transfer, moves data, and simulates DMA progress or completion. This TSR program interfaces with the Intel 8237 (and follow-on) DMA controllers produced by Intel which are normally used in ISA computers and others. It is assumed that the reader is familiar with the registers and function of these controllers. The TSR program also interfaces with the system page register which is essentially standardized on PC's and ISA computers.

Following is the pseudocode used by the TSR software to perform DMA emulation.

I Initialization for DMA emulation:
 Clear the auto-DMA state flag.
 Invalidate the DMA controller by writing −1 to the current address register. This value is later checked to assure that the DMA controller was actually set prior to the start of a transfer. If it is not, it is assumed that the DMA channel is MASKED at the time the transfer was requested, and the transfer is NOT emulated.

II Trigger command that would start a DMA on a SB Audio Card:
 (This could be a trap of a play-data SB command for example.) MASK the DMA controller's channel to stop the channel in case it is running (for host computers where the DMA default setting is Active).

(a) IF the command is to start an auto-DMA session
  (the byte length of a transfer BLOCK is passed in command data, and the Maximum allowable number of DMA bytes that can be transferred is stored in the DMA controller's word-count register. The Maximum allowable number of DMA bytes is an integral number of BLOCKS);
 THEN
  Set the auto-DMA state flag;
  Read the DMA controller s word-count register and save it;
  Read the DMA controller's current-address register and save it;
  Go to START_DMA;
 ENDIF (b) IF the command is a single byte input transfer (used for card detection in some host computers);
 THEN
  CALL GET_DMA_STATE to get the physical address of the input buffer;
  Complement the data byte at the physical address. This simulates an input DMA (from card to host) because the data changed in the input buffer. The game uses this to verify DMA is functioning.
  Invalidate the DMA controller by writing −1 to the current count register;
  Simulate End-of-Transfer (terminal count—(TC)) by issuing a single byte block mode physical DMA transfer;
  Simulate a SB interrupt by calling the SB interrupt chain. This allows the games's end-of-transfer interrupt handler to run;
 ENDIF the command is a single byte input transfer (used for card detection).

(c) IF the command is to start a data output transfer (the byte length of the transfer is passed as command data);
 THEN
 START_DMA:
  CALL GET_DMA_STATE to get the physical address of the input buffer where the application put the data it wants to play (e.g., host memory 2);
  Copy the data from the PC buffer AT the physical address FOR the commanded length of the transfer to the card's data-cache if present—or an I/O port;
  Instruct the DSP or other sound generating device on the audio card to start playing the data, which will result in a (DSP) end-of-transfer interrupt (device dependent);

ENDIF the command is to start a data output transfer.

III DSP End-Of-Transfer Interrupt handler:

(This interrupt is sent whenever the DSP or other sound generating device, for instance, finishes playing all of the sound data that was cached in the data-cache or memory of the card.)

(a) IF the system is in auto-DMA state
THEN
Simulate a SB interrupt by calling the SB interrupt chain. This allows the games's end-of-transfer interrupt handler to run.
IF the DMA controller's Word-Count is equal to zero
THEN
UPDATE the physical DMA controller registers as follows:
1) Current-Address=Original DMA address (saved above)
2) Word-Count=Original DMA Word-Count (saved above)
ELSE
UPDATE the physical DMA controller registers as follows:
1) Current-Address=Current-Address plus auto-DMA command length
2) Word-Count=Word-Count minus auto-DMA BLOCK size
ENDIF the Word-Count is equal to zero
Go to START_DMA
ENDIF the system is in auto-DMA state (b) IF the system is NOT in auto-DMA state
THEN (the transfer is completed)
Invalidate the DMA controller by writing −1 to the current count register. Simulate End-of-Transfer (terminal count—(TC)) by issuing a single byte block mode physical DMA transfer. (This is useful where DMA is active without an accessory card contacting the DMA control line as is the case in some ISA computer.)
Simulate a SB interrupt by calling the SB interrupt chain. This allows the games's end-of-transfer interrupt handler to run.
ENDIF the system is NOT in auto-DMA state
Return from Interrupt.

The following subroutine is used in the above pseudocode illustration:

IV GET DMA STATE subroutine:
Read the DMA controller's current address register
IF the current address is −1
THEN
Flag transfer cannot be done because the controller was never written to, and is assumed to be MASKED.
RETURN because of the error condition
ENDIF (i) DMA address adjustment:
This is used in cases where the DMA controller actually starts running when the game application unmasks it. Some computers default state for DMA-Request is ACTIVE when no real hardware is plugged in to pull the DMA-Request signal to the inactive state. This can have the effect of making the DMA controller free running, whenever it is unmasked. When it starts running, then both the current address and current count registers change, so the following adjustment is applied to try to recover the base address of the DMA requested.
IF the DMA controller reached TC (Terminal count (the Maximum of bytes that can be transferred)) it ran all of the DMA
THEN
ADJUST the DMA controller as follows:
1) Current Address=Current Address minus the transfer size that was sent in the SB command.
2) Current Count=Current Count plus the transfer size that was sent in the SB command.
ELSE (partial or NO DMA progress made)
ADJUST the DMA controller as follows:
1) Current Address=Current Address minus (command transfer-size minus DMA's current count register).
2) Current Count=Current Count plus (command transfer size minus DMA's current count register).
ENDIF the DMA controller reached TC (it ran all of the DMA).

(ii) construct the DMA physical address:
Read the DMA controller's current address register;
Read the system's page register (this indicates which 64K page of PC memory the DMA controller is pointing to);
Construct the physical address (page=segment, current address=offset);
Read the DMA controller's current word count register;
RETURN with the DMA physical address and the DMA count register;
END of GET_DMA_STATE subroutine.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A method of simulating a direct memory access (DMA) function without using DMA request and DMA acknowledge signals to access memory in a host computer having a DMA controller controlling access to said memory for the purpose of enabling the transfer of data between said memory and a non-DMA computer accessory data handling device that can be operably connected to said host comprising:

determining the location in said host memory for data to be transferred from said host memory to said accessory data handling device or from said accessory data handling device to said host memory; and initiating a DMA operation by storing in a memory of said accessory data handling device, control information which includes (1) an amount of data to be transferred and (2) a type of operation to be performed;

reading from the accessory data handling device the amount of data to be transferred and the type of operation to be performed;

for a data transfer from said host memory to said accessory data handling device, reading data from said host memory and writing it to said accessory data handling device; or for a data transfer from said accessory data handling device to said host memory, reading data from said accessory data handling device and writing it to said host memory, respectively;

informing said host computer that a DMA operation corresponding to said data transfer has been completed.

2. The method of claim 1, wherein said location in said host memory is determined by reading memory address contents of said DMA controller.

3. The method of claim 2, wherein said operation of reading the memory address contents of said DMA controller includes reading the starting address of the location in said host memory for said data.

4. The method of claim 3, wherein a maximum amount of data to be transferred is read from the DMA controller.

5. The method of claim 4, wherein the information in said DMA controller is updated to indicate the end of a DMA operation when said data transfer has been completed.

6. The method of claim 3, wherein the address information in said DMA controller is updated as data is transferred between said host memory and said accessory data handling device to maintain the currency of said DMA controller information corresponding to information that would be present if an actual DMA access of said host memory had taken place.

7. The method of claim 4, wherein the determination of said starting address includes calculating an address compensation factor for determining the correct starting address if said DMA controller of said host free runs when it is unmasked.

8. A method of simulating direct memory access with a non-DMA accessory data handling device in a computer system without using DMA request and DMA acknowledge signals, said computer system comprising a host computer having memory and a DMA controller for accessing said memory, said host computer being adapted to accept said accessory data handling device; in which an application program (host application) adapted to run on said host using DMA data transfers sets up the DMA controller with the starting address location in said memory of data to be transferred between said host and said accessory data handling device, and which application sends a command to said accessory data handling device to commence DMA operation, said method comprising the steps of:

initiating a DMA operation by storing in a memory of said accessory data handling device, control information which includes (1) an amount of data to be transferred and (2) a type of operation to be performed, responding to said application command requesting a commencement of DMA operation, by interrupting said host application to initiate a TSR program, said TSR program:

reading from said DMA controller the starting address and reading from said memory of said accessory data handling device the amount of data to be transferred and the type of operation to be performed, reading data from said host memory or said accessory data handling device respectively;

writing data to said accessory data handling device or said host memory respectively to transfer said data;

continuing said data transfer until a required amount of data to be transferred has been transferred;

updating addressing information in said DMA controller during said data transfer to correspond to the information that would be present in said DMA controller if a true DMA operation were taking place;

informing the host application that the DMA operation has been completed after all of said required data has been transferred.

9. The method of claim 8, wherein the information in said DMA controller is updated to indicate the end of a DMA operation when said data transfer has been completed.

10. The method of claim 8, wherein said application program sets up a maximum amount of data to be transferred between said host and said accessory data handling devices, said responding step further includes reading from DMA controller the maximum amount of data to be transferred.

11. A computer system comprising a host computer having memory and a DMA controller for accessing said memory, said host computer being adapted to accept a non-DMA accessory data handling device; in which an application program adapted to run on said host using DMA data transfers sets up the DMA controller with the address location in said memory of data to be transferred between said host and said accessory data handling device, and which application initiates a DMA operation by sending a command to and storing control information in, said accessory data handling device said control information includes (1) an amount of data to be transferred and (2) a type of operation to be performed; said computer system including:

means for simulating direct memory access with said accessory data handling device without using DMA request and DMA acknowledge signals comprising:

said accessory data handling device having memory means for storing said control information;

means for responding to said application command and interrupting said application program, to (1) read from said DMA controller the address of data, to be transferred and (2) read from said memory in said accessory data handling device the amount of data to be transferred and the type of operation to be performed;

means for reading data from said host memory or said accessory data handling device and, for writing data to said accessory data handling device or said host memory respectively to transfer said data;

means for updating addressing information in said DMA controller during said data transfer to correspond to the information that would be present in said DMA controller if a true DMA operation were taking place;

means for informing the host application that the DMA operation has been completed after all of said data has been transferred.

12. The system of claim 11, further including means for updating said DMA controller to signal the end of a DMA operation after all of said data has been transferred.

13. The system of claim 11, wherein said accessory data handling device comprises a PCMCIA audio accessory card.

14. A computer system comprising a host computer having a memory, a DMA controller to control access thereto and means for simulating a direct memory access (DMA) function for enabling a non-DMA computer accessory data handling device to access said memory without using DMA request and DMA acknowledge signals which are coupled to said DMA controller, said simulating means comprising:

means for determining the location in said host memory for data to be transferred from said host memory to said accessory data handling device or from said accessory data handling device to said host memory;

means for initiating a DMA operation by storing control information in a memory of said accessory data handling device said control information includes (1) an amount of data to be transferred and (2) a type of operation to be performed, means for reading from the accessory data handling device the amount of data to be transferred and the type of operation to be performed;

means for reading data from said host memory at the address specified in said DMA controller for said data and for writing said data to said accessory data handling device; or for reading data from said accessory and writing it to said host memory at the address specified by said DMA controller, respectively;

means for informing said host computer that a DMA operation corresponding to said data transfer has been completed.

15. The system of claim 14, wherein said determining means includes means for reading memory address contents of said DMA controller.

16. The system of claim 15, wherein said determining means includes means for reading from said DMA controller the starting address of the location in host memory for said data, and the maximum amount of data to be transferred.

17. The system of claim 16, further including means for updating information in said DMA controller to indicate the end of a DMA operation when said data transfer has been completed.

18. The system of claim 16, wherein said determining means includes means for calculating an address compensation factor for determining the correct starting address if said DMA controller of said host free runs when it is unmasked.

19. The system of claim 14, wherein said accessory data handling device comprises a PCMCIA audio accessory card.

20. The system of claim 14, further including means for updating said address information in said DMA controller as data is transferred between said host and said accessory data handling device to maintain the currency of said DMA controller information corresponding to information that would be present if an actual DMA access of said memory had taken place.

21. The system of claim 14, further including means for updating information in said DMA controller to indicate the end of a DMA operation when said data transfer has been completed.

22. A computer program recorded on suitable media for operating on a host computer having memory and a DMA controller for accessing said memory, for enabling a non-DMA computer accessory data handling device to simulate a direct memory access (DMA) function to access said memory in said host computer without using DMA request and DMA acknowledge signals comprising:

a first routine for determining a location in said host memory for data to be transferred from said host memory to said accessory data handling device or from said accessory data handling device to said host memory, said first routine also for initiating a DMA operation by storing in a memory of the accessory data handling device control information which includes (1) an amount of data to be transferred and (2) a type of operation to be performed and storing said control information in a memory of said accessory data handling device;

a second routine for interrupting said first routine and reading from the accessory data handling device the amount of data to be transferred and the type of operation to be performed;

said second routine also for reading data from said host memory at the address specified in said DMA controller for said data and for writing it to said accessory data handling device or reading data from said accessory data handling device and writing it to said host memory at the address specified by said DMA controller for said data, respectively; and, said second routine further for informing said host computer that a DMA operation corresponding to said data transfer has been completed.

23. The program of claim 22, wherein said determining routine includes a routine for reading the memory address contents of said DMA controller.

24. The program of claim 23, wherein said determining routine includes a routine for reading from said DMA controller the starting address of the location in host memory for said data, and for reading the maximum amount of data to be transferred.

25. The program of claim 24, further including a routine for updating information in said DMA controller to indicate the end of a DMA operation when said data transfer has been completed.

26. The program of claim 24, wherein said routine for the determination of said starting address includes a routine for calculating an address compensation factor for determining the correct starting address if said DMA controller of said host free runs when it is unmasked.

27. The program of claim 22, further including a routine for updating said address information in said DMA controller as data is transferred between said host and said accessory data handling device to maintain the currency of said DMA controller information corresponding to information that would be present if an actual DMA access of said memory had taken place.

28. The program of claim 22, further including a routine for updating information in said DMA controller to indicate the end of a DMA operation when said data transfer has been completed.

* * * * *